(12) United States Patent  (10) Patent No.: US 8,386,958 B1
Zavitaev et al.  (45) Date of Patent: Feb. 26, 2013

(54) METHOD AND SYSTEM FOR CHARACTER INPUT

(75) Inventors: Alexey Zavitaev, St. Petersburg (RU); Sergey Nazarkin, St. Petersburg (RU)

(73) Assignee: Oracle America, Inc., Redwood Shores, CA (US)

( * ) Notice: Subject to any disclaimer, the term of this patent is extended or adjusted under 35 U.S.C. 154(b) by 1115 days.

(21) Appl. No.: 11/854,353

(22) Filed: Sep. 12, 2007

(51) Int. Cl.
*G06F 3/048* (2006.01)

(52) U.S. Cl. ........ 715/810; 715/773; 715/780; 715/830; 345/168

(58) Field of Classification Search .................. 715/773, 715/810, 830, 780; 345/168
See application file for complete search history.

(56) References Cited

U.S. PATENT DOCUMENTS

| | | | | |
|---|---|---|---|---|
| 5,798,760 A * | 8/1998 | Vayda et al. | ................... | 715/834 |
| 6,373,450 B1 * | 4/2002 | Fujita | .............................. | 345/26 |
| 6,523,079 B2 * | 2/2003 | Kikinis et al. | ................. | 710/303 |
| 6,967,903 B2 * | 11/2005 | Guanter | ........................ | 368/224 |
| 6,993,727 B2 * | 1/2006 | De Ceulaer et al. | .......... | 715/843 |
| 7,286,115 B2 * | 10/2007 | Longe et al. | ................... | 345/168 |
| 7,458,035 B2 * | 11/2008 | Lindemann | .................... | 715/784 |
| 2002/0093535 A1 * | 7/2002 | Murphy | ......................... | 345/764 |
| 2007/0162936 A1 * | 7/2007 | Stallings et al. | ................. | 725/58 |
| 2007/0229316 A1 * | 10/2007 | Park et al. | ........................ | 341/22 |
| 2007/0296704 A1 * | 12/2007 | Park et al. | ...................... | 345/169 |
| 2008/0001915 A1 * | 1/2008 | Pihlaja et al. | ................... | 345/156 |
| 2008/0024452 A1 * | 1/2008 | Ford et al. | ...................... | 345/169 |
| 2008/0168381 A1 * | 7/2008 | Nelson et al. | .................. | 715/780 |
| 2009/0213085 A1 * | 8/2009 | Zhen et al. | ..................... | 345/173 |

\* cited by examiner

*Primary Examiner* — Robert Stevens
*Assistant Examiner* — Patrick Riegler
(74) *Attorney, Agent, or Firm* — Osha • Liang LLP

(57) ABSTRACT

A method for character input, involving activating a first rotating character ribbon on a display associated with a portable electronic device, wherein the rotating character ribbon includes a first plurality of characters for selection, selecting at least one character from the first rotating character ribbon, wherein the at least one character is selected using a positioning device on the portable electronic device, and storing the at least one selected character as part of a text sequence on the portable electronic device.

16 Claims, 3 Drawing Sheets

METHOD AND SYSTEM FOR CHARACTER INPUT

BACKGROUND

With the technical progress in electronics and telecommunications, handheld devices have become smaller in size, while simultaneously incorporating extended functionality. For example, a single handheld device can now handle text messaging, electronic mail, web browsing, playing music, and mobile phone functions. Many of the aforementioned functions utilize text editing capabilities, which require the ability to enter characters in an easy and quick manner.

Character input on small form factor electronic devices may be accomplished in several different ways. Typically, character input on handheld electronic devices is performed using a physical keyboard that either plugs into the handheld device or is located on the handheld device. The physical keyboard that externally attaches to the handheld device may be a standard keyboard used for character input in personal computers and laptops. When the keyboard is located on the handheld device, the characters of the physical keyboard are typically displayed over numbers or other keys on the handheld device, such as on a mobile phone. Thus, a user may be required to press a key with the character written on it several times until the required character is displayed. Even with the inclusion of auto-complete functionality, a user often needs to select the completed word from a list of displayed words, requiring further selection steps by the user.

On some handheld devices, text entry or character input is performed using a stylus or pen to "write" on the screen of the handheld device. In this method of character input, either a user's handwriting or typed characters corresponding to symbols entered using the stylus or pen may be displayed in the resulting written message. Further, some handheld devices incorporate a virtual keyboard displayed on the display screen of the device, where characters may be selected using touchscreen functionality. Such a device also typically requires a stylus or pen for the selection of characters, and often requires the use of two hands for character input.

SUMMARY

In general, in one aspect, the invention relates to a method for character input, comprising activating a first rotating character ribbon on a display associated with a portable electronic device, wherein the rotating character ribbon comprises a first plurality of characters for selection, selecting at least one character from the first rotating character ribbon, wherein the at least one character is selected using a positioning device on the portable electronic device, and storing the at least one selected character as part of a text sequence on the portable electronic device.

In general, in one aspect, the invention relates to A system for character input, comprising a display associated with a portable electronic device, the display comprising a first rotating character ribbon, wherein the first rotating character ribbon comprises a first plurality of characters for selection, and a text field configured to display at least one character selected from the first plurality of characters, and a positioning device configured to select the at least one character from the first rotating character ribbon, wherein the selected at least one character is stored as part of a text sequence on the portable electronic device.

In general, in one aspect, the invention relates to a computer readable storage medium comprising computer program code for character input, the computer program code comprising instructions to activate a first rotating character ribbon on a display associated with a portable electronic device, wherein the rotating character ribbon comprises a first plurality of characters for selection, select at least one character from the first rotating character ribbon, wherein the at least one character is selected using a positioning device on the portable electronic device, and store the at least one selected character as part of a text sequence on the portable electronic device.

Other aspects of the invention will be apparent from the following description and the appended claims.

DETAILED DESCRIPTION

Figure 1:
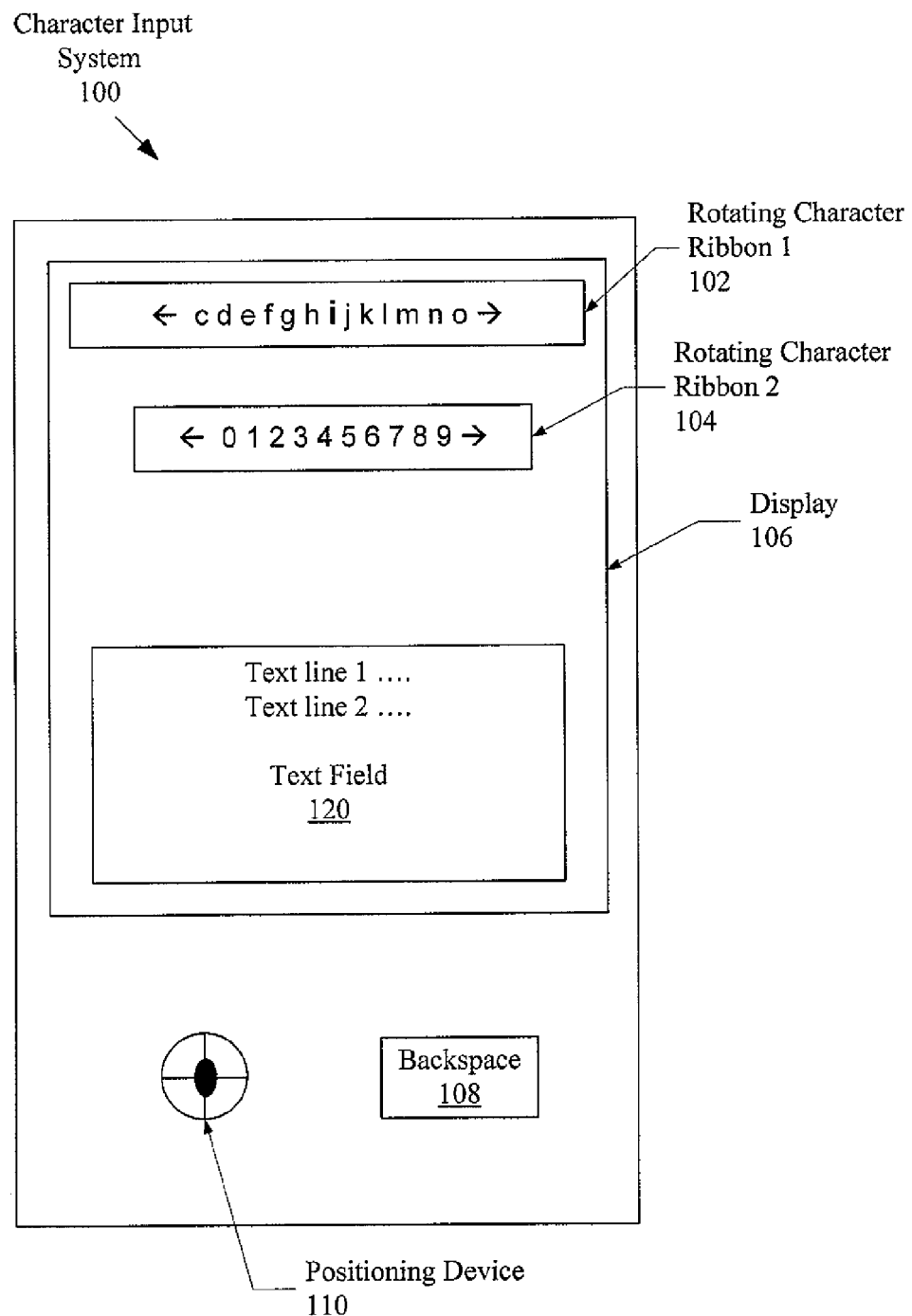
FIG. 1 shows a system for character input in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for character input. Specifically, embodiments of the invention provide a quick and easy method for character input for portable electronic devices with limited display area. Further, embodiments of the invention provide a device for character input including one or more rotating character ribbons and a positioning device.

FIG. 1 shows a system for character input (100) in accordance with one or more embodiments of the invention. Specifically, FIG. 1 shows a character input system (100) that includes a display (106), a backspace key (108), and a positioning device (110). The display (106) includes one or more rotating character ribbons (e.g., rotating character ribbon 1 (102), rotating character ribbon 2 (104)), and a text field (120). Each of the aforementioned components of FIG. 1 is described in detail below.

In one or more embodiments of the invention, the character input system (100) of FIG. 1 may be implemented on any portable electronic device. For example, the portable electronic device may be a mobile phone, a gaming device, an electronic wrist watch, a personal digital assistant, or any other handheld device. The display (106), which may be a liquid crystal display (LCD) screen (or any other type of display suitable for a portable electronic device), is configured to display the rotating character ribbons (102, 104) and the text field (120). Each rotating character ribbon (102, 104) is configured to automatically rotate at a default speed and to display multiple characters for selection. In one or more embodiments of the invention, characters in a rotating character ribbon (102, 104) may include alphanumeric characters, numbers, numerals, images (such as emotions, icons, etc.), pictographs that may be expanded into words/phrases when selected or entered, symbols, punctuation marks, character sets associated with different natural languages, or any combination thereof. Further, in one or more embodiments of the invention, each rotating character ribbon (102, 104) may include a different set of characters (i.e., characters from alphabets of different languages, special symbols, numeric characters, etc.). For example, as shown in FIG. 1, rotating character ribbon 1 (102) may include alphabetical characters, and rotating character ribbon 2 (104) may include only numerical characters.

Those skilled in the art will appreciate that although rotating character ribbon 1 (102) is shown with alphabetical characters and rotating character ribbon 2 (104) is shown with numbers, either or both rotating character ribbons may include one or more types of characters described above. Thus, in one or more embodiments of the invention, the rotating character ribbon(s) may be used to create text sequences in multiple languages. Alternatively, multiple rotating character ribbons may include the same set of characters (including numbers, symbols, characters, punctuation marks, etc.), where each rotating character ribbon moves at a different speed of rotation for selection of the characters. Further, those skilled in the art will appreciate that although FIG. 1 shows two rotating character ribbons, embodiments of the present invention may be implemented with a single rotating character ribbon, or more than two rotating character ribbons, depending on the display capabilities of the portable electronic device.

In one or more embodiments of the invention, the default rotation speed of each rotating character ribbon (102, 104) can be modified (i.e., increased or decreased) for selection of characters. Further, rotating character ribbon 1 (102) may rotate at a different speed than rotating character ribbon 2 (104). For example, if a rotating character ribbon includes a smaller number of characters, a user may find it more convenient for that rotating character ribbon to rotate at a faster speed than a rotating character ribbon that includes more characters for selection.

The text field (120) is configured to display text sequences created when one or more characters are selected from the rotating character ribbons (102, 104). In addition, the text field (120) may also display incoming messages that are received by the portable electronic device.

Continuing with FIG. 1, in one or more embodiments of the invention, the positioning device (110) is used to select one or more characters from the rotating character ribbons (102, 104). The positioning device may be a joystick (i.e., a handheld stick that pivots about one end), a flat button that includes four or more distinct areas in which the button may be pressed, a touch pad with directional sensors, positional keys (e.g., up, down, left, right), or any other object that may be used to navigate in at least four directions. In one or more embodiments of the invention, the positioning device (110) may be placed in a "pressed" position for selection of characters from one or more rotating character ribbons (102, 104). In one or more embodiments of the invention, the positioning device (110) is a four-position joystick that is configured to perform multiple functions of the character input system (100). For example, in one or more embodiments of the invention, the positioning device (110) may be used to input characters when pressed, and control the direction of rotation of the rotating character ribbons (102, 104) and the speed of the rotating character ribbons (102, 104).

Those skilled in the art will appreciate that although only one positioning device (110) is shown, the character input system (100) may include multiple positioning devices, such as a joystick and one or more positional keys. The positional keys, in additional to the joystick, may allow a user to navigate the rotating character ribbons (102, 104) and the text field (120). Thus, when multiple types of positioning devices are present, each positioning device may provide the same functionality or various different functions. Further, the character input system (100) may include a backspace key (108) used to delete selected characters from the text field (120), navigate back in a menu sequence, and/or undo selected functions. Those skilled in the art will appreciate that the positioning device (110) may include positional navigation ability and character deletion ability, in which case the backspace key (108) may not be included in the character input system (100).

Figure 2:
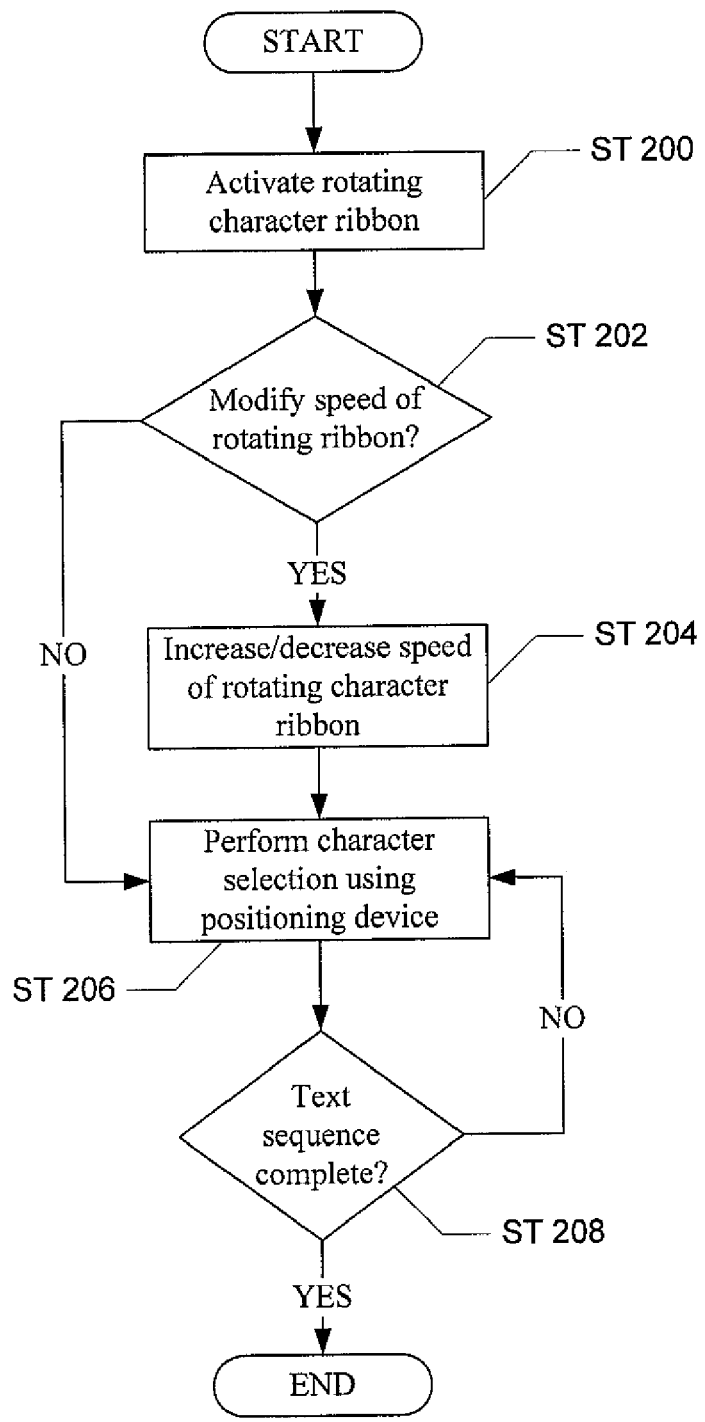
FIG. 2 shows a flow chart in accordance with one or more embodiments of the invention.

FIG. 2 shows a flow chart for inputting characters in accordance with one or more embodiments of the invention. In one or more embodiments of the invention, one or more of the steps shown in FIG. 2 may be omitted, repeated, performed in a different order, and/or performed concurrently. Accordingly, the specific arrangement of steps shown should not be construed as limiting the scope of the invention.

Initially, a rotating character ribbon on the display of a portable electronic device is activated (Step 200). In one or more embodiments of the invention, the rotating character ribbon is activated by proactively selecting the ribbon using a positional device (e.g., a joystick or one or more positional keys) on the portable electronic device. In one or more embodiments of the invention, the positioning device may be used to cause the rotating character ribbon to rotate in one direction or the other, e.g., similar to using a scrollbar to move text left or right in other types of applications. Alternatively, in one or more embodiments of the invention, the rotating character ribbon is activated when a message is received on the portable electronic device. For example, an e-mail or text message received on the portable electronic device may automatically activate one or more rotating character ribbons to facilitate character selection for responding to the received message. In one or more embodiments of the inventions, a rotating character ribbon is not displayed on the portable electronic device until the rotating character ribbon is activated.

In one or more embodiments of the invention, when a rotating character ribbon is activated, the rotating character ribbon begins to rotate at a default speed, and characters included within the rotating character ribbon move across the display of the portable electronic device. Those skilled in the art will appreciate that if more than one rotating character ribbon is present in the character input system, then the character input system may activate one rotating character ribbon at a time. Thus, in one or more embodiments of the invention, a first of several rotating character ribbons may initially be activated, and a user may then select a different rotating character ribbon to activate after the default rotating character ribbon is automatically activated based on an event that occurs (e.g., the receiving of a message on the portable electronic device). Alternatively, all the rotating character ribbons may rotate at different or default speeds simultaneously, and any of the one or more rotating character ribbons may be used to select characters on the portable electronic device. Further, the default active rotating character ribbon may be changed by a user.

Subsequently, a determination is made as to whether the speed of the rotating character ribbon needs to be modified (Step 202). Specifically, the speed at which the rotating character ribbon moves may be increased or decreased, depending on how fast (or slow) character selection takes place on the portable electronic device. If the speed is modified, then the speed of the rotating character ribbon is increased or decreased (Step 204).

In one or more embodiments of the invention, the speed of the rotating character ribbon may be modified using a positioning device while the rotating character ribbon is selected or activated. For example, to increase the speed of an active rotating character ribbon, the positioning device may be moved or pressed in the "up" direction. Similarly, to decrease the speed of an active rotating character ribbon, the positioning device may be moved in the "down" direction. To set the speed or return to the default rotating speed of an active rotating character ribbon, the positioning device may be pressed in the center. Alternatively, if the speed of the rotating character ribbon is not modified, the process continues to Step 206.

At this stage, character selection is performed using the positioning device and the rotating character ribbon (Step 206). Specifically, one or more characters appearing on the rotating character ribbon may be selected using the positioning device on the portable electronic device. The selected character(s) may subsequently be displayed in a text field of the portable electronic device as part of a text sequence. If the text sequence is complete (Step 208), then the process ends. Alternatively, if the text sequence is not complete, steps 206-208 may be repeated until the text sequence is complete.

In one or more embodiments of the invention, the text sequence formed by selecting one or more characters from the rotating character ribbon may be used to compose a message on the portable electronic device. For example, an e-mail message or a text message may be composed using characters selected from the rotating character ribbon. Further, the composed message may be transmitted using the positioning device on the portable electronic device. Alternatively, a separate key may be used to send a composed message.

Embodiments of the invention are particularly useful when embodied on a portable electronic device with limited screen capability (i.e., limited display lines), although those skilled the art will appreciate that the present invention may be implemented on any portable electronic device with a larger or small display screen. By providing a positioning device (e.g., a joystick) which may be used to control the selection of characters from one or more rotating character ribbons, text sequences can be quickly and easily created for multi-tasking users.

The system for character input may be implemented on any type of portable electronic device. In one or more embodiments of the invention, the portable electronic device may be a component that is wirelessly connected to a mobile phone or a handheld device that includes a larger display screen, where the component itself may be used to create and transmit text sequences using the present invention. For example, the system for character input may be implemented on an electronic watch, a pair of eyeglasses including an embedded display, or Bluetooth enabled wireless arm band, earpiece, etc., that is wirelessly linked to a user's mobile phone or personal digital assistant. The electronic watch includes limited display space and may not be able to display a complete virtual keyboard. In this case, a single rotating character ribbon and a positioning device included on the electronic watch may be used to select characters, create text sequences, and transmit text sequences or messages from the wirelessly connected mobile device or personal digital assistant. Further, embodiments of the invention may be implemented on slider mobile phones (i.e., mobile phones that include a full keyboard for typing text sequences when a portion of the mobile phone is slid up or slid down to reveal the keyboard), where the sliding portion of the mobile phone does not need to be used.

Figure 3:
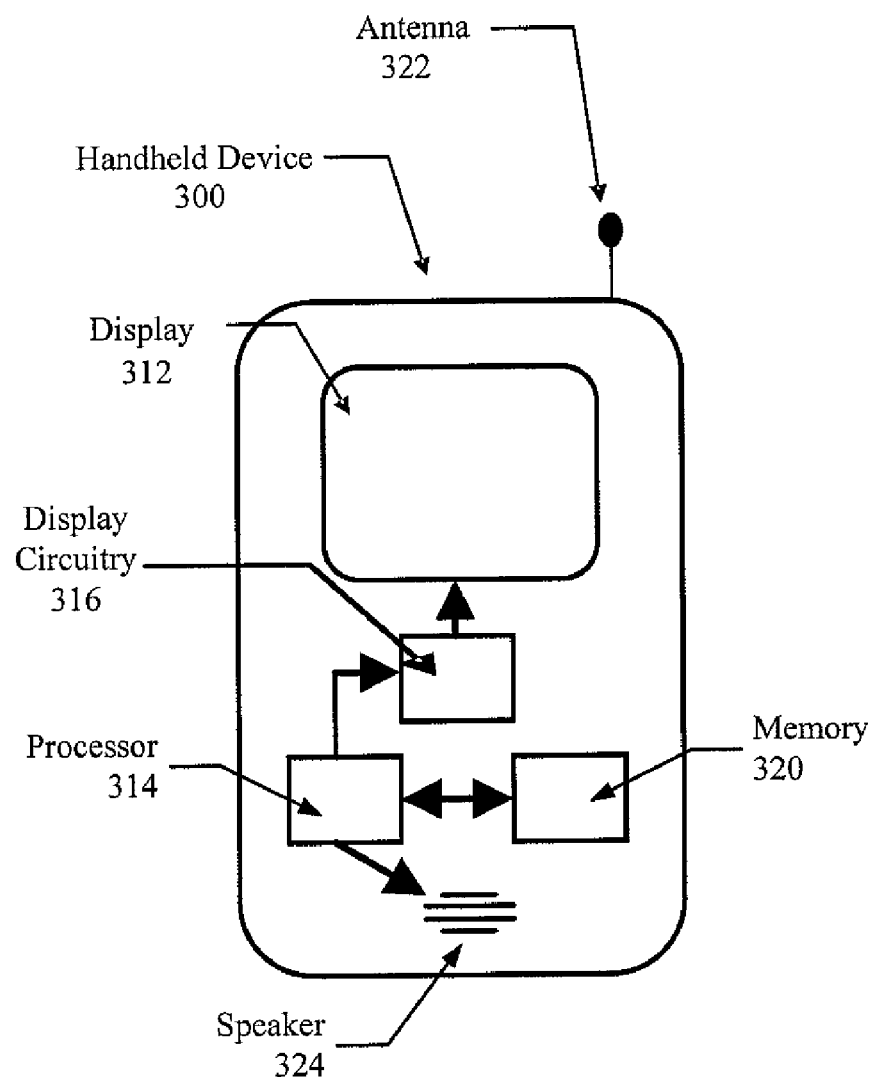
FIG. 3 shows a handheld device in accordance with one or more embodiments of the invention.

The invention may be implemented on virtually any type of portable electronic device, regardless of the platform being used. For example, as shown in FIG. 3, a portable electronic device may be any handheld device (300) with a wireless interface that is configured to connect to a wireless access point. Such handheld devices include, but are not limited to, mobile phones, personal digital assistants, web tablets, gaming devices, pocket personal computers, electronic watches, eyeglasses with embedded displays, wireless arm bands, laptop computers, etc. The handheld device (300) shown in FIG. 3 includes an antenna (322) for communicating with the wireless access point (not shown), a display (312), a speaker (324), a processor (314), associated memory (320), and display circuitry (316) for displaying, among other things, one or more rotating character ribbons on the display (312). Further, the handheld device (300) may be a slider device, in which case the handheld device (300) may include one or more components that slide up/down or left/right to reveal an input means (such as a keyboard) and/or output means (such as a display LCD). The handheld device (300) may also include a keyboard and/or a joystick and/or positional keys (all not shown).

Further, software instructions to perform embodiments of the invention may be stored on a computer readable medium such as a compact disc (CD), a diskette, a tape, or any other computer readable storage device. The stored software instructions may be available over a network, such as the Internet, and may be downloaded via the network and stored on the handheld device. Alternatively, the stored software instructions may be transferred to storage space on the handheld device using a network cable that plugs into the handheld device, such as a USB cable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for character input, comprising:
   activating a first rotating character ribbon on a display associated with a portable electronic device,
   wherein the rotating character ribbon comprises a first plurality of characters for selection, and
   wherein the first rotating character ribbon is activated when a message is received on the portable electronic device;
   activating a second rotating character ribbon on the display,
   wherein the second rotating character ribbon is activated by selecting the second rotating character ribbon using a positioning device on the portable electronic device,
   wherein the second rotating character ribbon comprises a second plurality of characters,
   wherein upon activation, the first and second rotating character ribbons automatically rotate on the display, and
   wherein the first rotating character ribbon rotates automatically at a first speed of rotation and the second rotating character ribbon rotates automatically at a second speed of rotation distinct from the first speed of rotation;
   selecting at least one first character from the first rotating character ribbon and at least one second character from the second rotating character ribbon, wherein the at least one first and second character are selected using the positioning device on the portable electronic device; and storing the at least one first and the at least one second selected characters as part of a text sequence on the portable electronic device.

2. The method of claim 1, wherein the display includes a limited number of display lines.

3. The method of claim 1, wherein the at least one character selected from the first rotating character ribbon comprises a character selected from a group consisting of an alphanumeric character, a symbol, an image, a pictograph, and a punctuation mark.

4. The method of claim 1, wherein the first plurality of characters comprises alphanumeric characters.

5. The method of claim 1, further comprising:
adjusting a speed of the first rotating character ribbon.

6. The method of claim 1, wherein the text sequence is part of a message composed on the portable electronic device, and wherein the message is one selected from the group consisting of an electronic mail message and a text message.

7. The method of claim 1, wherein the portable electronic device is one selected from a group consisting of a mobile phone, a personal digital assistant, a gaming device, eyeglasses comprising an embedded display, a wireless arm band, and an electronic watch.

8. The method of claim 1, wherein the positioning device is one selected from a group consisting of a joystick and a plurality of positional keys.

9. A system for character input, comprising:
a display associated with a portable electronic device, the display comprising:
a first rotating character ribbon configured to automatically rotate on the display at a first speed of rotation, wherein the first rotating character ribbon comprises a first plurality of characters for selection, and wherein the first rotating character ribbon is activated when a message is received on the portable electronic device;
a second rotating character ribbon comprising a second plurality of characters configured to automatically rotate on the display at a second speed of rotation distinct from the first speed of rotation, wherein the second rotating character ribbon is activated by selecting the second rotating character ribbon using a positioning device on the portable electronic device; and
a text field configured to display at least one character selected from the first plurality of characters; and
the positioning device configured to:
select the at least one first character from the first rotating character ribbon and at least one second character from the second rotating ribbon,
wherein the selected at least one first and the at least one second character are stored as part of a text sequence on the portable electronic device.

10. The system of claim 9, wherein the display includes a limited number of display lines.

11. The system of claim 9, wherein the at least one character comprises at least one character selected from a group consisting of an alphanumeric character, a symbol, an image, a pictograph, and a punctuation mark.

12. The system of claim 9, wherein the first rotating character ribbon comprises alphanumeric characters.

13. The system of claim 9, wherein the first speed of rotation associated with the first rotating character ribbon and the second speed of rotation associated with the second rotating character ribbon are each adjustable.

14. The system of claim 9, wherein the portable electronic device is one selected from a group consisting of a mobile phone, a personal digital assistant, a gaming device, a wireless earpiece associated with a mobile device, a wireless arm band, eyeglasses comprising an embedded display, and an electronic watch.

15. The system of claim 9, wherein the text sequence is part of a message composed on the portable electronic device, and wherein the message is one selected from the group consisting of an electronic mail message and a text message.

16. A non-transitory computer readable storage medium comprising computer program code for character input, the computer program code comprising instructions to:
activate a first rotating character ribbon on a display associated with portable electronic device, wherein the rotating character ribbon comprises a first plurality of characters for selection, and wherein the first rotating character ribbon is activated when a message is received on the portable electronic device;
activate a second rotating character ribbon on the display, wherein the second rotating character ribbon is activated by selecting the second rotating character ribbon using a positioning device on the portable electronic device,
wherein the second rotating character ribbon comprises a second plurality of characters,
wherein upon activation, the first and second rotating character ribbons automatically rotate on the display, and
wherein the first rotating character ribbon rotates automatically at a first speed of rotation and the second rotating character ribbon rotates automatically at a second speed of rotation distinct from the first speed of rotation;
select at least one first character from the first rotating character ribbon and at least one second character from the second rotating character ribbon, wherein the at least one first and second characters are selected using the positioning device on the portable electronic device; and
store the at least one first and the at least one second selected characters as part of a text sequence on the portable electronic device.

\* \* \* \* \*